US008321824B2

(12) United States Patent
Zejda et al.

(10) Patent No.: US 8,321,824 B2
(45) Date of Patent: Nov. 27, 2012

(54) MULTIPLE-POWER-DOMAIN STATIC TIMING ANALYSIS

(75) Inventors: Jindrich Zejda, Sunnyvale, CA (US); William Chiu-Ting Shu, Palo Alto, CA (US); Khalid Rahmat, Fremont, CA (US); Feroze Taraporevala, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 239 days.

(21) Appl. No.: 12/433,184

(22) Filed: Apr. 30, 2009

(65) Prior Publication Data

US 2010/0281444 A1  Nov. 4, 2010

(51) Int. Cl.
*G06F 9/455* (2006.01)
(52) U.S. Cl. .................................. 716/108; 716/113
(58) Field of Classification Search ............... 716/6, 55, 716/113, 106, 108
See application file for complete search history.

(56) References Cited

U.S. PATENT DOCUMENTS

| 6,421,784 | B1 * | 7/2002 | Chu et al. ........................ 713/401 |
| 6,437,804 | B1 * | 8/2002 | Ibe et al. ......................... 715/736 |
| 6,792,582 | B1 * | 9/2004 | Cohn et al. ...................... 716/120 |
| 7,142,991 | B2 * | 11/2006 | Hathaway et al. ............... 702/57 |
| 7,216,315 | B2 * | 5/2007 | Yoshida ............................. 716/55 |
| 7,337,418 | B2 * | 2/2008 | Kale et al. ........................ 716/106 |
| 7,650,246 | B2 * | 1/2010 | Beatty et al. ..................... 702/57 |
| 7,698,674 | B2 * | 4/2010 | Kalafala et al. ................. 716/113 |
| 2004/0163018 | A1 * | 8/2004 | Yoshida ............................. 714/48 |
| 2005/0138588 | A1 * | 6/2005 | Frenkil .............................. 716/6 |
| 2006/0229828 | A1 * | 10/2006 | Hathaway et al. ............... 702/57 |
| 2007/0050160 | A1 * | 3/2007 | Beatty et al. ..................... 702/64 |
| 2008/0092092 | A1 * | 4/2008 | Dalton et al. ..................... 716/4 |
| 2008/0209373 | A1 | 8/2008 | Buck |

FOREIGN PATENT DOCUMENTS

| KR | 1020050064124 | 6/2005 |
| WO | 02101600 A1 | 12/2002 |
| WO | 2004066092 A2 | 8/2004 |
| WO | 2004084053 A1 | 9/2004 |

OTHER PUBLICATIONS

Zedja, Jindrich et al., "General Framework for Removal of Clock Network Pessimism", Synopsis, Inc., pp. 1-8.

* cited by examiner

*Primary Examiner* — Vuthe Siek
*Assistant Examiner* — Mohammed Alam
(74) *Attorney, Agent, or Firm* — Park, Vaughan, Fleming & Dowler LLP; Laxman Sahasrabuddhe (57) ABSTRACT

Embodiments of a computer system, a method, an integrated circuit and a computer-program product (i.e., software) for use with the computer system are described. These devices and techniques may be used to perform STA for circuits that include multiple power domains. Power-domain crossing information and optionally the delay in each power domain can be propagated during the full circuit graph-based STA to accurately perform STA without enumerating all paths. Some embodiments can use a tag-based engine to track power-domain crossing(s) during graph-based STA. If a power-domain is crossed in a path, pessimism may be added to the cumulative delay at the end point of the path. For those paths that do not cross a power domain, pessimism may be removed from the cumulative delay at their end points. In some embodiments, pessimism may be removed from the cumulative delay at end points for paths that cross power domains.

24 Claims, 7 Drawing Sheets

MULTIPLE-POWER-DOMAIN STATIC TIMING ANALYSIS

BACKGROUND

1. Field

This disclosure generally relates to electronic design automation. More specifically, this invention relates to a technique for adjusting cumulative delay values in graph-based static timing analysis.

2. Related Art

Rapid advances in computing technology have made it possible to perform trillions of computational operations each second on data sets that are sometimes as large as trillions of bytes. These advances can be largely attributed to the exponential increase in the size and complexity of integrated circuits.

Because of this increase in size and complexity of integrated circuits, it has become necessary to use sophisticated tools to verify timing constraints in circuit designs, such as static timing analysis (STA). During graph-based STA, worst-case delay values are accumulated along nodes in a graph-based representation of a circuit by considering the delay values associated with different edges incident on these nodes without enumerating all possible paths through the circuit. Using this graph-based STA, one or more critical paths in the circuit can be identified. Then, path-based STA is performed to determine the slack values more accurately by reducing pessimism in the identified paths.

Note that on-chip variations in timing-related parameters during the design and fabrication of integrated circuits are often modeled in STA techniques using derating factors, which are used to change (or derate) delay values to reflect on-chip variation. Because STA can perform a reasonably accurate timing analysis for many large integrated circuits within a reasonable amount of time, it has emerged as the method of choice for verifying timing constraints for large integrated circuits.

Large integrated circuits often include multiple power supplies that define separate power domains. Intentional differences and unintentional variations in the supply voltages provided by these power supplies directly impact the delay values in these integrated circuits.

Unfortunately, existing approaches for performing STA in multiple-power-domain circuits are either inaccurate, or inefficient, or both. In some techniques, a graph-based STA, which is designed to work on single-power-domain circuits, is performed to identify a set of paths, and a more detailed path-based STA is performed on the identified paths to account for the multiple power-domains. Unfortunately, since the graph-based STA that is used in these approaches does not take into account the multiple power-domains in the circuit, these techniques are fundamentally inaccurate. This is because the identified paths on which the path-based STA is performed may not include the worst-case path, and hence, this technique may completely miss the worst-case path.

In other techniques, an exhaustive approach is used to consider all possible voltage combinations. If there are V discrete voltages per domain in N power domains, the number of STA runs equals $V^N$. Thus, in a circuit with 7 power domains that each has a minimum and a maximum supply voltage, the number of STA runs is $2^7$ or 128. Since the number of STA runs required in this approach grows exponentially with the number of power domains, this approach is simply impractical for circuits with a large number of power domains.

SUMMARY

Some embodiments of the present invention provide techniques and systems to perform graph-based STA for a circuit that includes multiple power-domains. During the graph-based STA, a computer system can receive delay values for different supply voltage levels. Then, the computer system can perform the graph-based STA for the circuit. In particular, when performing this graph-based STA, the computer system can: propagate cumulative delay values (arrival and required times) and power-domain crossing information through a graph-based representation of the circuit, where the power-domain crossing information at least keeps track of whether a power-domain was crossed while traversing the graph; and adjust cumulative delay values at end points (such as registers) of the graph based at least on the power-domain crossing information.

Note that adjusting the cumulative delay values may involve adding pessimism to a cumulative delay value if the power-domain crossing information indicates that the cumulative delay value was propagated across a power-domain boundary. For example, adding the pessimism may include applying a derating factor to the cumulative delay value (note that different derating factors are used for the launch and capture paths). Alternatively, the pessimism may be based at least on a physical model of delay as a function of changes in supply voltage which are associated with the power-domain crossings.

In other embodiments, adjusting the cumulative delay values involves removing pessimism from a cumulative delay value if the power-domain crossing information indicates that the cumulative delay value was not propagated across a power-domain boundary. Specifically, in this approach, the system uses a set of delay values that are pessimistic, and removes pessimism for paths that do not cross power-domain boundaries.

In some embodiments, the power-domain crossing information keeps track of cumulative delay contributions of each power domain as the cumulative delay values are propagated through the graph-based representation of the circuit. In these embodiments, adjusting the cumulative delay values may also involve removing pessimism from a cumulative delay value based at least on the cumulative delay contributions of each power domain. Specifically, in this approach, the system can keep track of the per-power-domain min/max delay values that were accumulated in each power domain (as opposed to just the total delay value) as the delay values are propagated through the graph.

Some embodiments of the present invention use the power-domain crossing information to remove pessimism that may have been added by the graph-based STA when it combined delays for high and low voltages within a power domain in which each device receives power from a correlated power supply.

Some embodiments provide a method for performing graph-based STA for the circuit that includes multiple power domains. This method may include at least some of the above-described operations. Other embodiments provide a computer-program product for use in conjunction with the computer system. This computer-program product may include instructions corresponding to at least some of the above-described operations. Yet other embodiments provide an electronic device, such as an integrated circuit, that performs at least some of the above-described operations.

BRIEF DESCRIPTION OF THE FIGURES

Table 1 illustrates exemplary delay values associated with components in circuit 200.

Table 2 illustrates exemplary delay values associated with components in circuit 200 at different supply voltages.

Note that like reference numerals refer to corresponding parts throughout the drawings.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a method, an integrated circuit and a computer-program product (i.e., software) for use with the computer system are described. These devices and techniques may be used to perform STA for circuits that include multiple power domains. In particular, during the STA technique, a tag-based engine may be used to track a power-domain crossing during graph-based STA. If a power-domain is crossed in a path, pessimism may be added to the cumulative delay at an end point of the path. Similarly, for those paths that do not cross a power domain, pessimism may be removed from the cumulative delay at an end point. Furthermore, in some embodiments, all power-domain crossings and the associated delay values are tracked during the graph-based STA to accurately estimate the delay in the circuit.

This STA technique provides flexibility to allow users of circuit-verification software to trade off: complexity, runtime, and overall accuracy. For example, using this STA technique the number of STA runs can be significantly reduced (to as few as one STA run). In addition, the accuracy of critical-path identification can be improved, and the pessimism of the determined cumulative delay values can be reduced. Consequently, this STA technique can make it easier to design integrated circuits and to verify their timing, thereby reducing the time and expense, and increasing customer satisfaction and retention.

Figure 1:
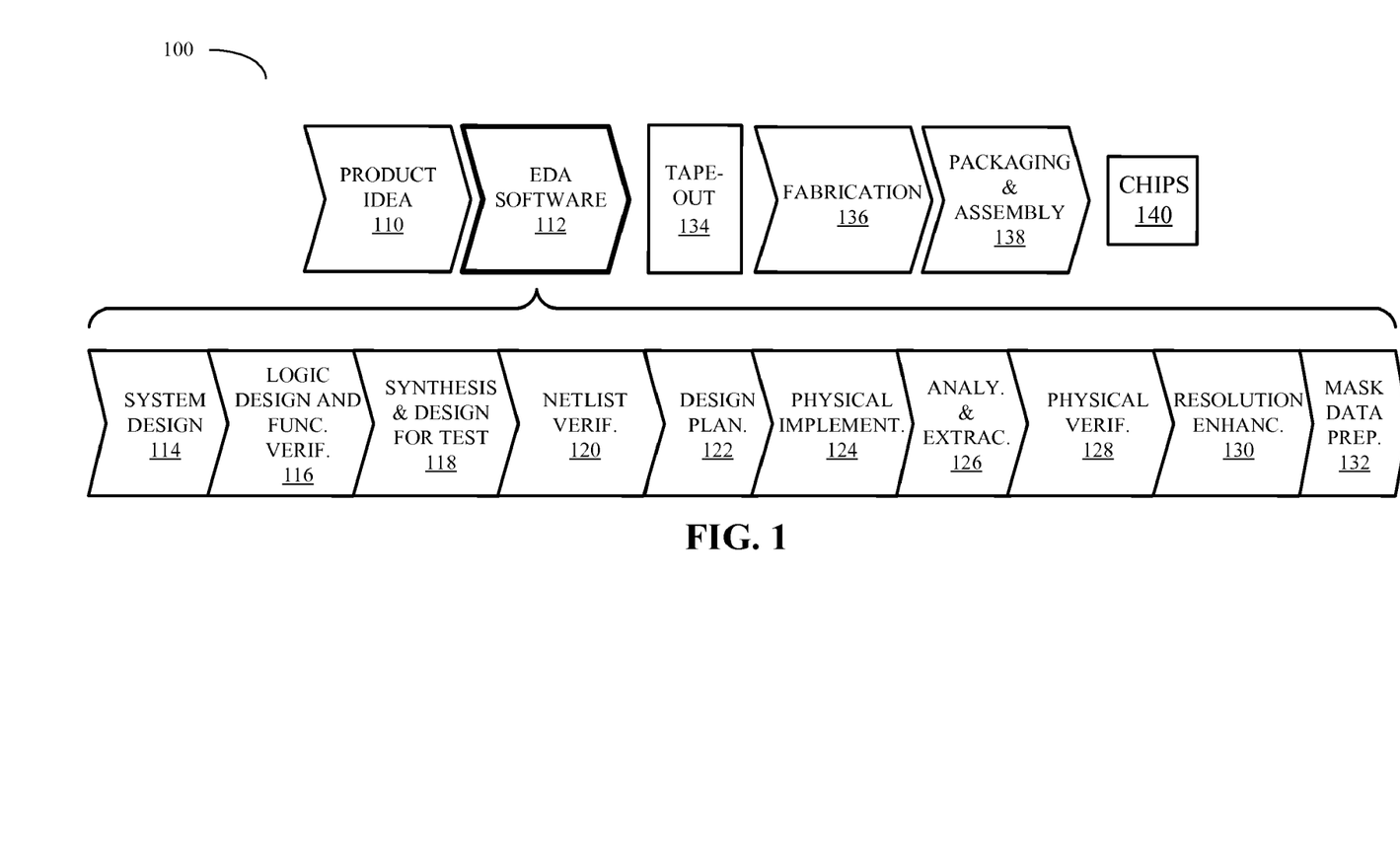
FIG. 1 is flowchart illustrating various operations in the design and fabrication of an integrated circuit in accordance with an embodiment of the present disclosure.

We now describe embodiments of design and fabrication of integrated circuits or chips. FIG. 1 presents a flowchart 100 illustrating the various operations in the design and fabrication of an integrated circuit. This process starts with the generation of a product idea (110), which is realized during a design process that uses electronic design automation (EDA) software (112). When the design is finalized, it can be taped-out (134). After tape-out, a semiconductor die is fabricated (136) and packaging and assembly processes (138) are performed, which ultimately result in finished chips (140).

Note that the design process that uses EDA software (112) includes operations 114-132, which are described below. This design flow description is for illustration purposes only. In particular, this description is not meant to limit the present disclosure. For example, an actual integrated circuit design may require a designer to perform the design operations in a different sequence than the sequence described herein.

During system design (114), designers describe the functionality to implement. They can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect®, Saber®, System Studio®, and Designware® products.

Then, during logic design and functional verification (116), VHDL or Verilog code for modules in the circuit is written and the design is checked for functional accuracy. More specifically, the design is checked to ensure that it produces the correct outputs. Exemplary EDA software products from Synopsys, Inc. of Mountain View, Calif. that can be used at this stage include: VCS®, Vera®, Designware®, Magellan®, Formality®, ESP® and Leda® products.

Next, during synthesis and design for test (118), VHDL/Verilog is translated to a netlist. This netlist can be optimized for the target technology. Additionally, tests can be designed and implemented to check the finished chips. Exemplary EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

Moreover, during netlist verification (120), the netlist is checked for compliance with timing constraints and for correspondence with the VHDL/Verilog source code. Exemplary EDA software products from Synopsys, Inc. of Mountain View, Calif. that can be used at this stage include: Formality®, PrimeTime® products, and VCS® products.

Furthermore, during design planning (122), an overall floor plan for the chip is constructed and analyzed for timing and top-level routing. Exemplary EDA software products from Synopsys, Inc. of Mountain View, Calif. that can be used at this stage include: Astro® and IC Compiler® products.

Additionally, during physical implementation (124), the placement (positioning of circuit elements) and routing (connection of the same) occurs. Exemplary EDA software products from Synopsys, Inc. of Mountain View, Calif. that can be used at this stage include: the Astro® and IC Compiler® products.

Then, during analysis and extraction (126), the circuit function is verified at a transistor level, which permits refinement. Exemplary EDA software products from Synopsys, Inc. of Mountain View, Calif. that can be used at this stage include: Astrorail®, Primerail®, PrimeTime® products, and Star RC/XT® products.

Next, during physical verification (128), the design is checked to ensure correctness for: manufacturing, electrical issues, lithographic issues, and circuitry. Exemplary EDA software products from Synopsys, Inc. of Mountain View, Calif. that can be used at this stage include the Hercules® product.

Moreover, during resolution enhancement (130), geometric manipulations of the layout are performed to improve manufacturability of the design. Exemplary EDA software products from Synopsys, Inc. of Mountain View, Calif. that can be used at this stage include: Proteus®, Proteus®AF, and PSMGED® products.

Additionally, during mask-data preparation (132), the 'tape-out' data for production of masks to produce finished chips is provided. Exemplary EDA software products from Synopsys, Inc. of Mountain View, Calif. that can be used at this stage include the Cats® family of products.

Embodiments of the present disclosure can be used during one or more of the above-described stages. Specifically, in some embodiments the present disclosure can be used during system design (114) and/or logic design and functional verification (116), for example, during STA of circuits.

Figure 2A:
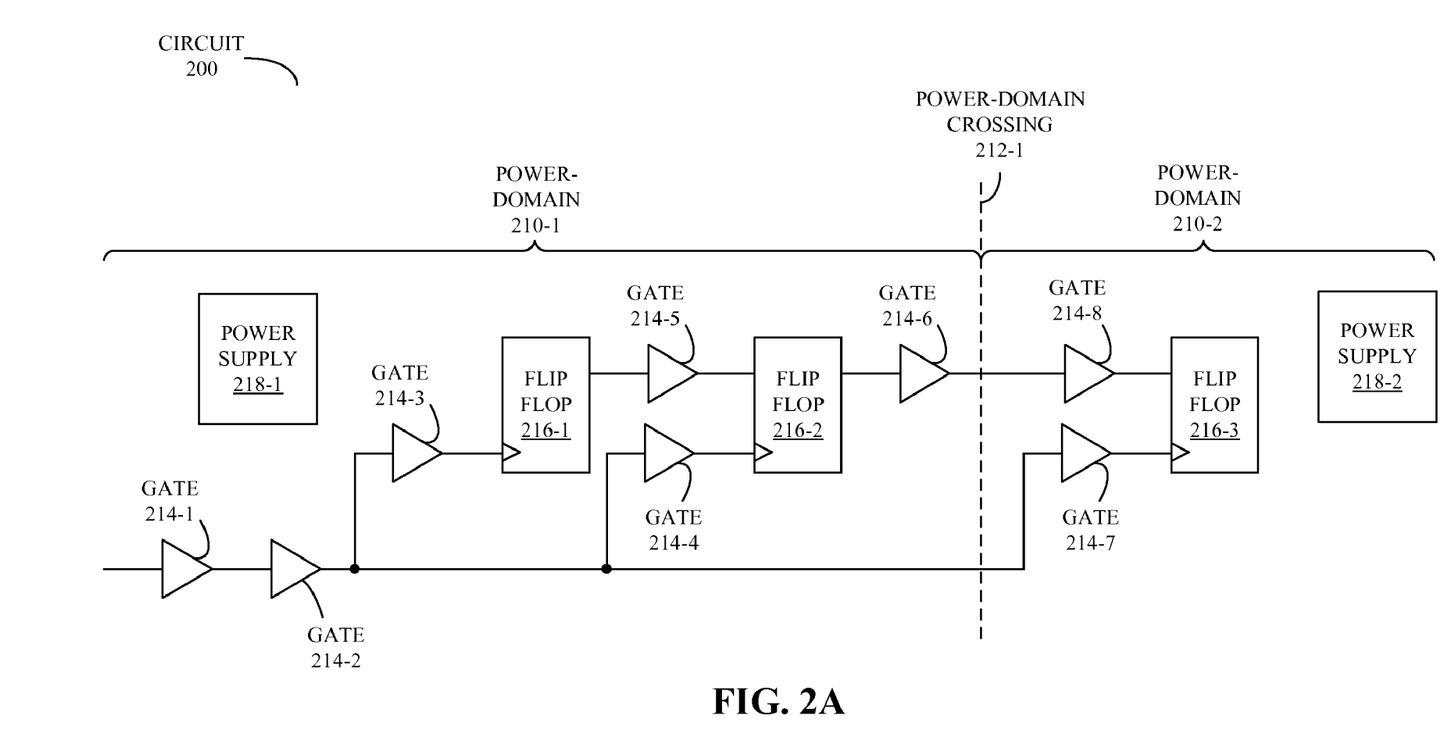
FIG. 2A is a block diagram illustrating a circuit that has multiple power domains in accordance with an embodiment of the present disclosure.

We now describe embodiments of a technique for performing efficient and accurate full-circuit or graph-based STA over all power-domain crossing paths in a circuit that includes multiple power domains. FIG. 2A presents a block diagram illustrating a circuit 200 that has multiple power domains 210. Each of power domains 210 can include one or more combinational or sequential circuit elements or blocks, such as one or more gates 214 and one or more registers (flip-flops or latches) 216. Note that, in general, circuit 200 can include: analog circuits, digital circuits and/or mixed signal circuits.

Power domains 210 can include power supplies 218. These power supplies can provide supply voltages to gates 214 and flip-flops 216. Moreover, the supply voltages can be independent of each other (i.e., the supply voltages can be at least partially uncorrelated). Note that the circuit elements shown in FIG. 2A are for illustration only, and are not intended to limit the present disclosure to the forms disclosed. For example, the circuit may include only one power supply which may supply different supply voltages to different parts of the circuit.

Because the delay values associated with a given gate depend on the supply voltage, the supply voltages in the different power domains 210 have an impact on the cumulative delay values along paths through circuit 200. In particular, each of power domains 210 defines a context for the components (or blocks) it contains.

Power domains can contain multiple power supplies. The term "power domain" in this disclosure refers to a group of cells powered by the same power supply or by different power supplies that are at least partially correlated. Consequently, the delay values of the components within the given power domain vary together or at least in a partially correlated manner as a function of the supply voltage. In contrast, because the supply voltages in different power domains 210 may be different and are at least partially uncorrelated, at least a portion of the delay values of the components in different power domain 210 are different and may not vary together as a function of the supply voltages. During STA, it is desirable to determine the worst-case scenario in which the different supply voltages in the different power domains result in the worst-case delay values.

Figure 2B:
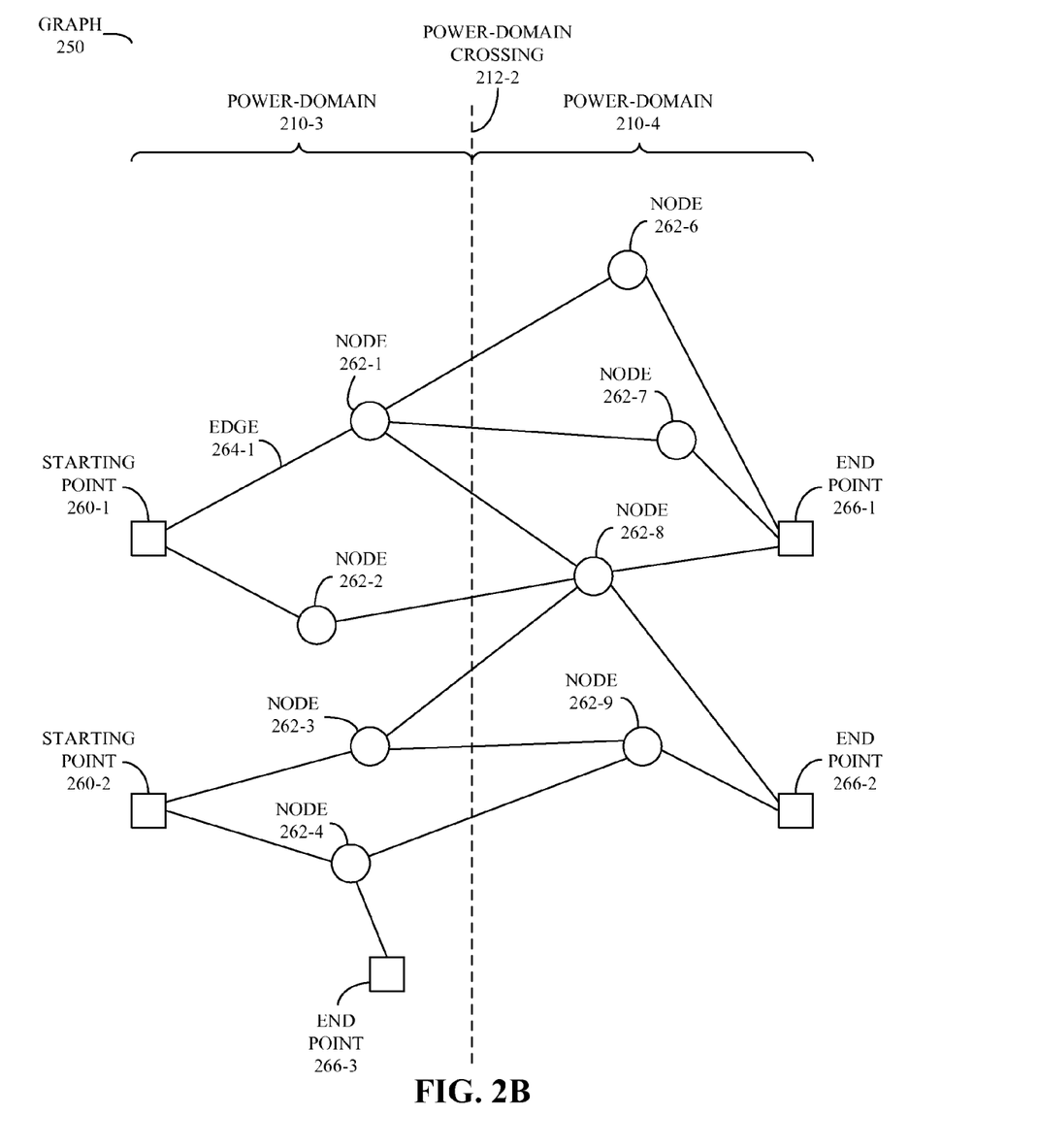
FIG. 2B is drawing of a graph representing a circuit in accordance with an embodiment of the present disclosure.

As noted previously, during STA, graph-based STA is often used to identify worst-case or critical paths. FIG. 2B presents graph 250 which represents a circuit (such as circuit 200 in FIG. 2A). During graph-based STA, the cumulative delay values are tracked while progressing or traversing (e.g., via a breadth first search) through graph 250. For example, starting at starting points 260, delay values can be propagated to a node (such as node 262-1) along each edge (such as edge 264-1) that is incident on the node, and the worst-case delay among all of the incoming edges can be stored, and propagated further through the graph. In this way, the worst-case delay for the entire circuit can be determined in a single pass through the graph. At end points 266, once the worst-case cumulative delay values are determined, they can be used to identify the worst-case critical path(s) through the circuit (including the starting point(s), the intervening node(s) and the end point(s)). The worst-case critical path(s) can be used in subsequent path-based STA to improve the accuracy of the worst-case slack or timing margin for the circuit (i.e., the difference between the arrival time and a capture time).

Note that graph-based STA allows the worst-case path to be identified using a single-pass through graph 250. Also note that, in general, we need to consider paths through graph 250 that traverse multiple power domains 210 (cross-power-domain paths), as well as paths through graph 250 that are entirely within a single power domain (intra-power-domain paths). For example a path in graph 250 that does not cross power-domain crossing 212-2 would be an intra-power-domain path, whereas a path that does cross power-domain crossing 212-2 would be a cross-power-domain path. As noted previously, if the impact of power domains 210 is not correctly accounted for, the correct worst-case path(s) through the circuit would not be identified, and the accuracy of the STA computation would be degraded.

In the discussion that follows, three embodiments of an STA technique are described for determining worst-case path delay values for circuits with multiple power-domains. These embodiments differ in: the amount of pessimism in the worst-case path delay values, the complexity of the analysis, runtime, and memory requirements. Specifically, these three embodiments can be viewed as being three different tradeoff points between accuracy and efficiency.

In a first embodiment, which is referred to as 'fast' STA, whether an edge in a given path has at least one power-domain crossing (which is sometimes referred to as 'power-domain-crossing information') is tracked while traversing graph 250. At the end point(s), pessimism is selectively added to the cumulative delay values (e.g., by applying a derating factor) for those paths that had at least one power-domain crossing. The fast STA approach can be viewed as an approach that starts with relatively optimistic delay values, and then selectively adds pessimism to the path delay values depending on whether the path crossed at least one power domain or not. Since only a single bit of information (which indicates whether or not a path crosses a power domain boundary) needs to be propagated, and since relatively few paths are expected to be cross-power-domain paths, this approach is highly efficient. However, since this approach typically propagates relatively optimistic delay values through the graph, the fast STA approach may not be suitable for situations in which the impact of capacitive-coupling crosstalk on delay values is not negligible.

In a second embodiment, which is referred to as 'detection' STA, whether an edge in a given path has at least one power-domain crossing is tracked while traversing graph 250. At the end point(s), pessimism is selectively reduced in the cumulative delay values for those paths that did not have at least one power-domain crossing (i.e., intra-power-domain paths), while pessimism is not reduced in the paths that have at least one power-domain crossing (i.e., cross-power-domain paths). Note that only a single bit of information (which indicates whether or not a path crosses a power domain boundary) needs to be propagated in the detection STA approach. However, the number of intra-power-domain paths can be relatively large, and hence, the detection STA approach can take more resources than the fast STA approach. Unlike the fast STA approach, the detection STA approach can be viewed as an approach in which relatively pessimistic delay values are propagated through the graph, and pessimism is selectively removed for intra-power-domain paths. As a result, unlike the fast STA approach, the detection STA approach is suitable for situations in which the impact of capacitive-coupling crosstalk on delay values is not negligible.

In a third embodiment, which is referred to as 'full' STA, all power-domain crossings and cumulative delay values accrued while traversing each power domain are tracked while traversing graph 250. At the end points, pessimism may be selectively reduced for both intra-power-domain paths and cross-power-domain paths.

Since the full STA approach propagates more information through the graph, and since the full STA approach removes pessimism on both intra-power-domain paths and cross-power-domain paths, the full STA approach typically requires more computational resources than either the fast STA approach or the detection STA approach. However, since the path delay values determined by the full STA approach are accurate, the technique may not require a path-based STA to be performed on the critical paths that are identified. In contrast, for both the fast STA approach and the detection STA approach, a more detailed path-based STA analysis may be required on the set of potential worst-case paths that are found by using these approaches.

The power-domain crossing information can generally be stored in any data structure. For example, the information can be stored in a data structure that is similar to the data structure that is used for carrying information about timing exceptions.

In some embodiments, the data structure that is used for carrying power domain crossing information is referred to as a "tag." Specifically, in one embodiment, the computer system may: assign one or more tags to the starting points of the circuit graph in an initial power domain; and modify the tags at nodes in the graph when power-domain crossings occur on edges, which are incident on these nodes. Furthermore, the computer system may add one or more new tags at nodes in the graph when power-domain crossings occur on edges in the graph, which are incident on these nodes.

A tag-based STA engine may assign tags to starting points 260 in an initial power domain 210-3. If a power-domain crossing occurs during fast or detection STA, a bit in a tag may be modified to indicate that there was at least one power-domain crossing. Then, at the end points 266, pessimism may be selectively added (during fast STA) or subtracted (during detection STA) based at least on the stored tag information. Note that in these embodiments, the cumulative delay values that are propagated through graph 250 may be stored separately from the tags.

During full STA, a new tag may be added when power-domain crossing information is propagated across a power-domain crossing (alternatively, or in addition to adding a tag, an existing tag may be modified). The tags may be used to store the cumulative delay values for the different supply voltages associated with the corresponding power domains 210. Then, at the end points 266, pessimism may be selectively subtracted based on the information stored in the tags (e.g., the cumulative delay values for each supply voltage in each power domain).

Note that pessimism can be added by using derating factors. For example, adding pessimism during fast STA may involve applying one derating factor to the capture path delay to decrease the delay along the capture path, and applying a second derating factor to the launch path delay to increase the delay along the launch path. Note that the adjustment of the delay values can be performed using delay models that are more complicated than simply applying derating factors to the delay values. For example, a physical model of delay can be used which defines the delay as a function of changes in supply voltage which are associated with the power-domain crossings. A more complicated delay model can further improve the accuracy of the path delay value, but such models typically increase the amount of computation required.

Because these embodiments of the STA technique are performed using a multiple-power-domain-aware graph-based approach, they allow timing analysis to be performed using a single STA run. Consequently, the number of STA runs can be significantly reduced without sacrificing accuracy. For example, in a circuit with 3-4 power domains, the number of STA runs (and thus the STA completion time) can be reduced by about 10 times.

Figure 3:
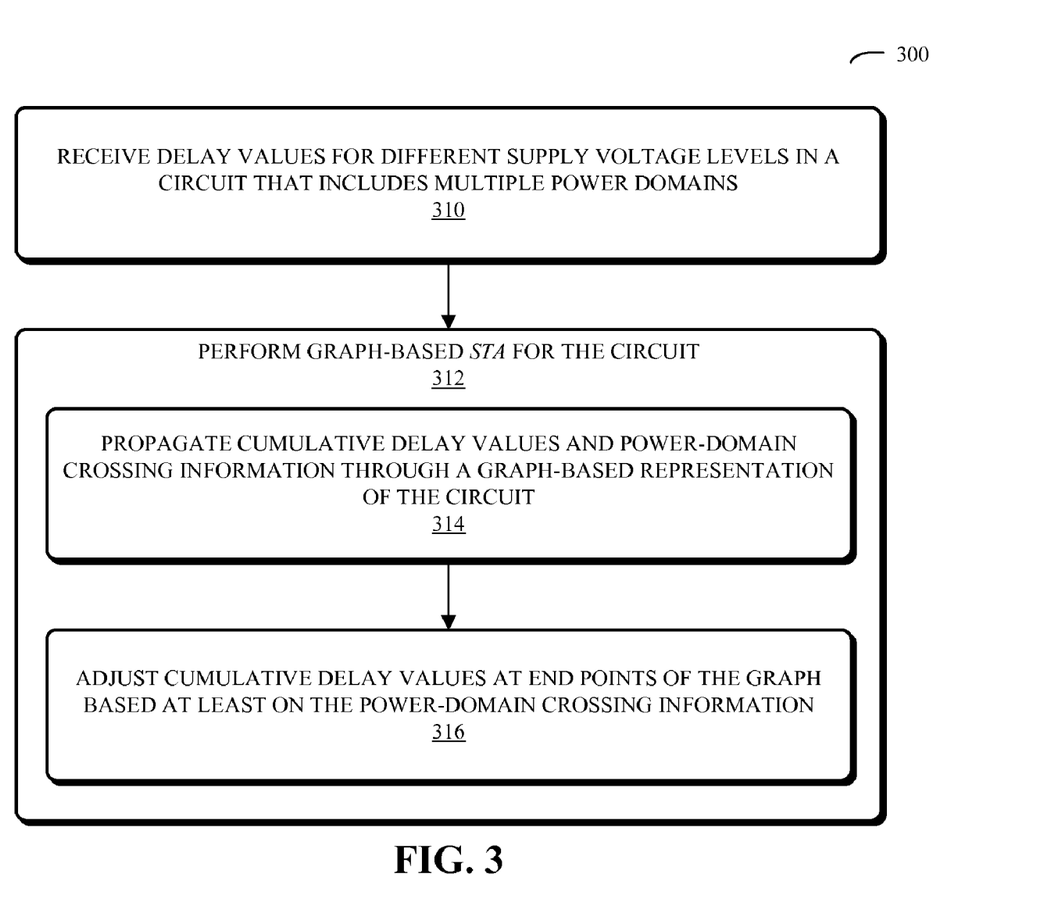
FIG. 3 is a flowchart illustrating a method for performing graph-based static timing analysis (STA) for the circuit of FIG. 2A in accordance with an embodiment of the present disclosure.

FIG. 3 presents a flowchart illustrating method 300 for performing graph-based STA for the circuit that includes multiple power domains, which may be performed by a computer system (and, more generally, by an electronic device, such as an integrated circuit). During the graph-based STA, the computer system receives delay values for different supply voltage levels in a circuit that includes multiple power domains (operation 310). Note that the system may compute the delay values based on a delay model. Then, the computer system performs graph-based STA for the circuit (operation 312). In particular, when performing this graph-based STA, the computer system: propagates cumulative delay values and power-domain crossing information through a graph-based representation of the circuit (operation 314), where the power-domain crossing information at least keeps track of whether a power-domain was crossed while traversing the graph; and adjusts cumulative delay values at end points of the graph based at least on the power-domain crossing information (operation 316).

As noted previously, there are several embodiments of adjusting the cumulative delay values. For example, pessimism may be added to a slack value if the power-domain crossing information indicates that the associated cumulative delay values were propagated across a power-domain boundary (fast STA). Alternatively, pessimism may be removed from a slack value if the power-domain crossing information indicates that the associated cumulative delay values were not propagated across a power-domain boundary (detection STA). Furthermore, in some embodiments, the power-domain crossing information keeps track of cumulative delay contributions of each power domain as the cumulative delay values are propagated through the graph-based representation of the circuit (full STA). In these embodiments, adjusting the slack values involves removing pessimism from the slack values based at least on the associated cumulative delay contributions of each power domain along launch and capture segments of the timing paths.

Note that all three embodiments—namely, fast STA, detection STA, and full STA—can use clock re-convergence pessimism removal (CRPR) to remove pessimism that results from using different delay values for circuit elements that are common to the launch path and the capture path. The slack values that are computed in the following examples have been adjusted using clock re-convergence pessimism removal.

Referring back to FIG. 2A, Table 1 illustrates exemplary delay values associated with components in circuit 200. Some embodiments use a derating process to add pessimism for cross domain paths. In the following example, the same delay value is used for all supply voltage levels in the analysis prior to derating. Cross domain paths will be penalized by 10%, i.e., the lauch delays will be multiplied by 1.1, and capture delays will be multiplied by 0.9. Without applying the derating factor, the slack at flip-flop 216-2 is −1.5 ns and the slack at flip-flop 216-3 is −3 ns. These are the slack values that would be computed by existing STA techniques that do not account for multiple power domains. Under the fast STA approach, the slack at flip-flop 216-2 remains unchanged at −1.5 ns because the fast STA approach does not add pessimism for paths that do not cross a power domain. However, under the fast STA approach, the slack at flip-flop 216-3 is −4.5 ns because the launch and capture segments for flip-flop 216-3 cross power domains.

Specifically, the launch path for flip-flop 216-2 begins at the input of gate 214-1, and passes through gates 214-2 and 214-3, and flip-flop 216-1, before terminating at the data input of flip-flop 216-2. The capture path for flip-flop 216-2 begins at the input of gate 214-1, and passes through gates 214-2 and 214-4, before terminating at the clock input of flip-flop 216-2. Hence, the delay along the capture path is (1.5+6+1.5) ns, and the delay along the launch path is (1.5+6+1.5+1.5) ns, which gives us a slack of −1.5 ns. The CRPR term is equal to 0 because we are using the same delay values for both the maximum and the minimum supply voltages, and no derate is being performed on paths that do not cross at least one power domain boundary. The slack computations can be similarly performed for flip-flop 216-3: capture delay is 0.9*(1.5+6+6), launch delay is 1.1*(1.5+6+1.5+1.5+6), and the CRPR is equal to 1.1*(1.5+6)−0.9*(1.5+6)=1.5. Hence, the final slack value for flip-flop 216-3 is −4.5.

TABLE 1

| Component  | Delay (ns) |
|------------|------------|
| Gate 214-1 | 1.5        |
| Gate 214-2 | 6          |
| Gate 214-3 | 1.5        |
| Gate 214-4 | 1.5        |
| Gate 214-5 | 1.5        |
| Gate 214-6 | 1.5        |
| Gate 214-7 | 6          |
| Gate 214-8 | 6          |

Table 2 illustrates exemplary delay values associated with components in circuit 200 at different supply voltages. For an existing STA approach, the slack at flip-flop 216-2 is −3 ns and the slack at flip-flip 216-3 is −7 ns. Using detection STA, the slack at flip-flop 216-2 is −2 ns (the pessimism is reduced because power-domain crossing 212-1 was not crossed). In this example, note that the slack at flip-flop 216-3 is −7 ns for both existing STA approaches and the detection STA approach (the slack is unchanged because power-domain crossing 212-1 was crossed).

Specifically, the delay along the capture path for flip-flop 216-2 is (1+4+1) ns, and the delay along the launch path for flip-flop 216-2 is (2+7+2+2) ns, which gives us a slack of −7 ns. The CRPR adjustment is equal to (1+3) ns, which gives us a CRPR-adjusted slack of −3 ns. Note that the CRPR adjustment is equal to the difference between the low and high delay values for gates 214-1 and 214-2. The slack value of −3 ns is what existing STA approaches would compute.

However, the detection STA and the full STA approaches described in this disclosure further reduce the pessimism in the slack for flip-flop 216-2 by using at least the following insight: the launch path and the capture path for flip-flop 216-2 are within the same power domain, and hence, the slack should be computed by using the delay values associated with either the maximum supply voltage or the minimum supply voltage, but not both. Based on this insight, the pessimism removal term for flip-flop 216-2 can be determined by taking the minimum of the following two values: (($D_{max}$ for gate 214-3+$D_{max}$ for gate 214-5)−($D_{min}$ for gate 214-3+$D_{min}$ for gate 214-5)), and ($D_{max}$ for gate 214-4−$D_{min}$ for gate 214-4). Note that in the pessimism removal term, $D_{min}$ indicates the delay value for the maximum supply voltage, and $D_{max}$ indicates the delay value for the minimum supply voltage, since higher voltages typically correspond to smaller delays. Using the exemplary delay values shown in Table 2, the pessimism removal term is equal to: min((2+2)−(1+1), (2−1))=1. Hence, after applying this adjustment to the slack for flip-flop 216-2, we obtain the more accurate slack value of −2 ns, which is less pessimistic than the −3 ns value that would be computed by existing STA approaches.

TABLE 2

| Component  | Delay at minimum supply voltage (ns) | Delay at maximum supply voltage (ns) |
|------------|---------------------------------------|---------------------------------------|
| Gate 214-1 | 2 | 1 |
| Gate 214-2 | 7 | 4 |
| Gate 214-3 | 2 | 1 |
| Gate 214-4 | 2 | 1 |
| Gate 214-5 | 2 | 1 |
| Gate 214-6 | 2 | 1 |
| Gate 214-7 | 7 | 4 |
| Gate 214-8 | 7 | 4 |

Note that, the detection STA approach does not adjust the slack for cross-power-domain paths. Hence, the slack for flip-flop 216-3 remains unchanged at −7 ns. However, unlike the detection STA approach, the full STA approach also reduces pessimism on cross-power-domain paths, which is explained below using the delay values in Table 2.

Using full STA and the delay values in Table 2, the slack at flip-flop 216-2 is −2 ns (which is the same as the one computed by detection STA) and the slack at flip-flop 216-3 is −4 ns (which is different from the one computed by detection STA). Note that, in full STA, pessimism has been reduced in both intra-power-domain paths and cross-power-domain paths.

The launch path and the capture path for flip-flop 216-3 are cross-power-domain paths because they go across power-domain crossing 212-1. The pessimism removal term for the slack for flip-flop 216-3 can be computed as follows. Note that the pessimism removal term for cross-power-domain paths will have a sub-term for each power domain. The pessimism removal term in the full STA approach is at least based on the following insight: since all circuit elements in a power domain operate at the same voltage, when computing the slack, we should use the delay values associated with either the maximum supply voltage or the minimum supply voltage, but not both.

Specifically, the launch path for flip-flop 216-3 begins at the input of gate 214-1, and passes through gates 214-2, 214-4, and 214-6, before terminating at the output of gate 214-8. The capture path for flip-flop 216-3 begins at the input of gate 214-1, and passes through gate 214-2, before terminating at the output of gate 214-7.

The pessimism removal term for the slack for flip-flop 216-3 includes two sub-terms: a first sub-term associated with power domain 210-1, and a second sub-term associated with power domain 210-2. The first sub-term can be computed by taking the minimum of the following two values: the difference between the maximum and minimum cumulative delays along the portion of the launch path that lies within power domain 210-1, and the difference between the maximum and minimum cumulative delays along the portion of the capture path that lies within power domain 210-1. Note that we don't consider the common portions between the launch path and the capture path because the pessimism introduced in that section is removed by the CRPR term. In other words, the first sub-term in the pessimism removal term is equal to $\min((D_{max}$ for gate $214\text{-}4 + D_{max}$ for gate $214\text{-}6) - (D_{min}$ for gate $214\text{-}4 + D_{min}$ for gate $214\text{-}6), 0) = \min((2+2) - (1+1), 0) = 0$. Note that the capture path for flip-flop 216-3 does not have any gates (excluding gates 214-1 and 214-2 that are common to the launch path and the capture path) that lie within power domain 210-1. Hence, the second term in the "min" function shown above is equal to 0.

The second sub-term in the pessimism removal term can be computed similarly. Specifically, for flip-flop 216-3, the second sub-term is equal to $\min(D_{max}$ for gate $214\text{-}8 - D_{min}$ for gate 214-8, $D_{max}$ for gate $214\text{-}7 - D_{min}$ for gate $214\text{-}7) = \min(7-4, 7-4) = 3$. Hence, the full STA approach would compute the slack for flip-flop 216-3 to be equal to −4 ns (recall that existing STA approaches computed a much more pessimistic slack of −7 ns).

Figure 4:
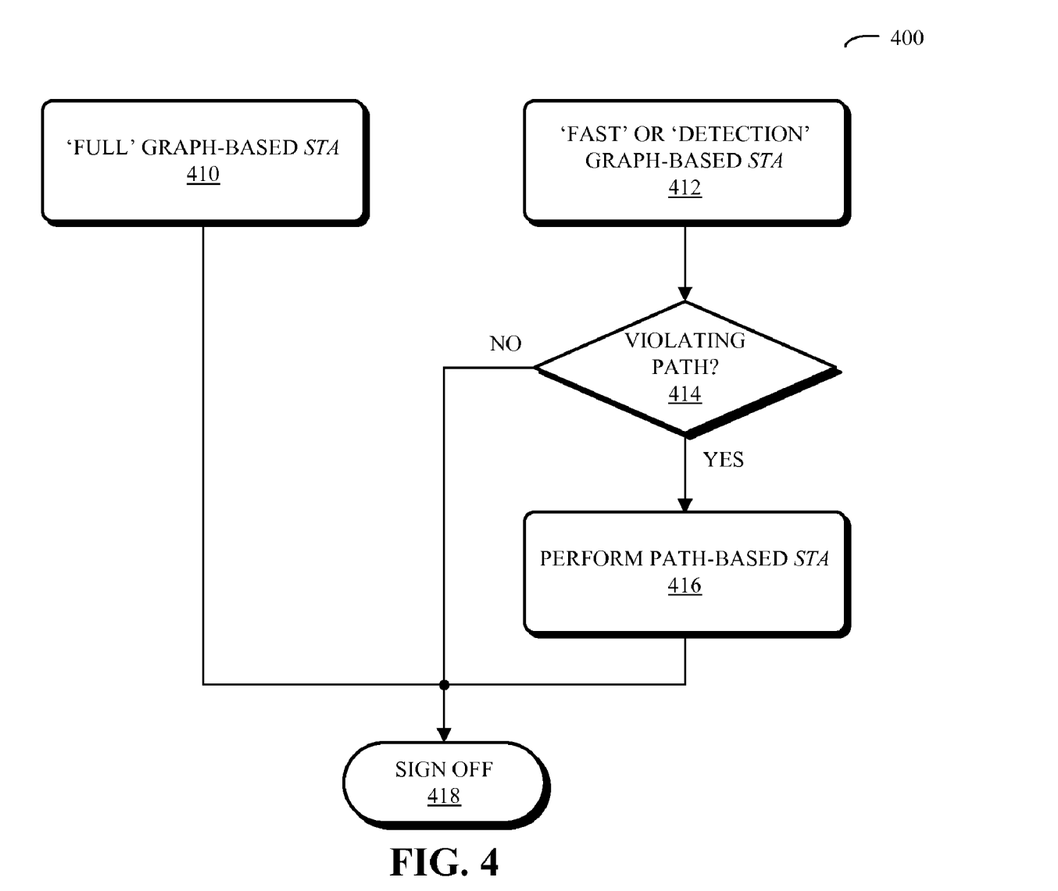
FIG. 4 is a flowchart illustrating a method for performing STA for the circuit of FIG. 2A in accordance with an embodiment of the present disclosure.

FIG. 4 presents a flowchart illustrating a method 400 for performing STA for circuit 200 (FIG. 2A). Method 400 may be performed by a computer system and, more generally, by an electronic device, such as an integrated circuit. Fast STA or detection STA may be used as a first pass to identify one or more critical paths (operation 412). If a path violates a design timing criterion (such as one that has a slack value that is too small) (operation 414), path-based STA (operation 416) may be performed prior to signing off on the design (operation 418). If none of the paths violates a design timing criterion (operation 414), the design may be signed off (operation 418). Alternatively, full STA (operation 410) may be performed to accurately perform timing analysis prior to signing off on the design (operation 418). Note that when full STA is performed, the system does not need to determine more accurate slack values by performing path-based STA on a set of critical paths identified by the graph-based STA approach.

In some embodiments of methods 300 (FIG. 3) and/or 400 there may be additional or fewer operations. Moreover, the order of the operations may be changed and/or two or more operations may be combined into a single operation.

Figure 5:
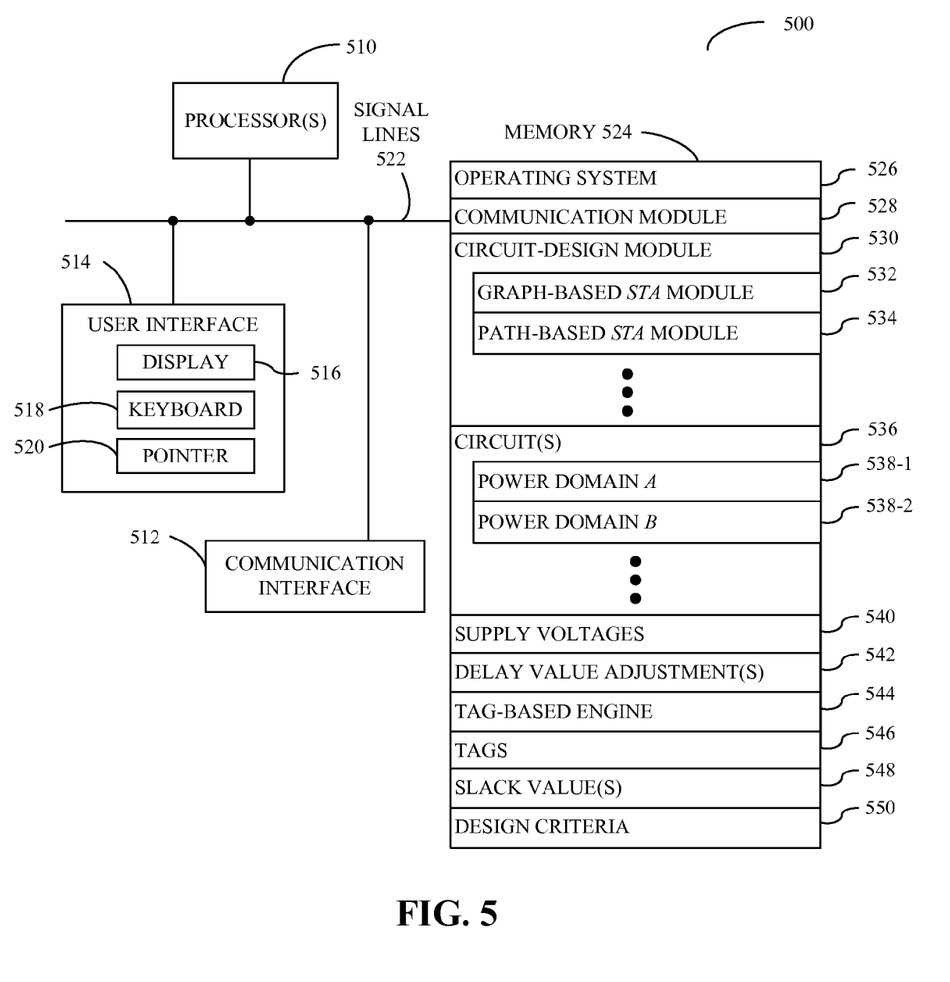
FIG. 5 is a block diagram illustrating a computer system that performs STA for the circuit of FIG. 2A in accordance with an embodiment of the present disclosure.

We now describe embodiments of a computer system that performs STA, such as methods 300 (FIG. 3) and/or 400. FIG. 5 presents a block diagram illustrating a computer system 500. Computer system 500 includes: one or more processors 510, a communication interface 512, a user interface 514, and one or more signal lines 522 coupling these components together. Note that the one or more processing units 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: circuit-design module 530 (or a set of instructions) and/or tag-based engine 544 (or a set of instructions). Moreover, circuit-design module 530 may include: graph-based STA module 532 (or a set of instructions) and/or path-based STA module 534 (or a set of instructions).

Using circuit-design module 530, a designer may design or verify one or more circuits 536, which include multiple power domains (such as power domain A 538-1 and power domain B 538-2). In particular, graph-based STA module 532 may perform fast, detection and/or full STA on the one or more circuits 536 using supply voltages 540. During this analysis, tag-based engine 544 may assign tags 546 to one or more different power domains. These tags may be updated to track at least one power-domain crossing (such as during fast or detection STA) while traversing a graph corresponding to a given circuit (or a portion of the given circuit). Alternatively, tags 546 may track the power-domain crossings, and/or the cumulative delay values which can be on a per power-domain basis. Delay value adjustments 542 can be computed and applied to cumulative delay values. As shown in FIG. 4, after fast or detection STA, in some embodiments path-based STA module 534 performs path-based STA on one or more identified critical paths in the given circuit.

Graph-based STA module 532 and/or path-based STA module 534 may output slack values 548 for the one or more circuits 536. These slack values may be compared to design criteria 550 to determine whether or not the designer can sign off on the one or more circuits 536.

Instructions in the various modules in the memory 524 may be implemented in: a high-level procedural language, an object-oriented programming language, and/or in an assembly or machine language. Note that the programming language may be compiled or interpreted, e.g., configurable or configured, to be executed by the one or more processing units 510.

Computer system 500 may include a variety of devices, such as: a personal computer, a laptop computer, a server, a work station, a main-frame computer, and/or other devices capable of manipulating computer-readable data.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. Consequently, computer system 500 may be at one location or may be distributed across multiple locations, such as computing systems that communicate via a network (such as the Internet or an intranet).

In some embodiments, some or all of the functionality of computer system 500 may be implemented in one or more: application-specific integrated circuit (ASICs), field-programmable gate array (FPGAs), and/or one or more digital signal processors (DSPs). Thus, the graph-based STA may be performed using an FPGA. Note that the functionality of computer system 500 may be implemented more in hardware and less in software, or less in hardware and more in software, as is known in the art.

Figure 6:
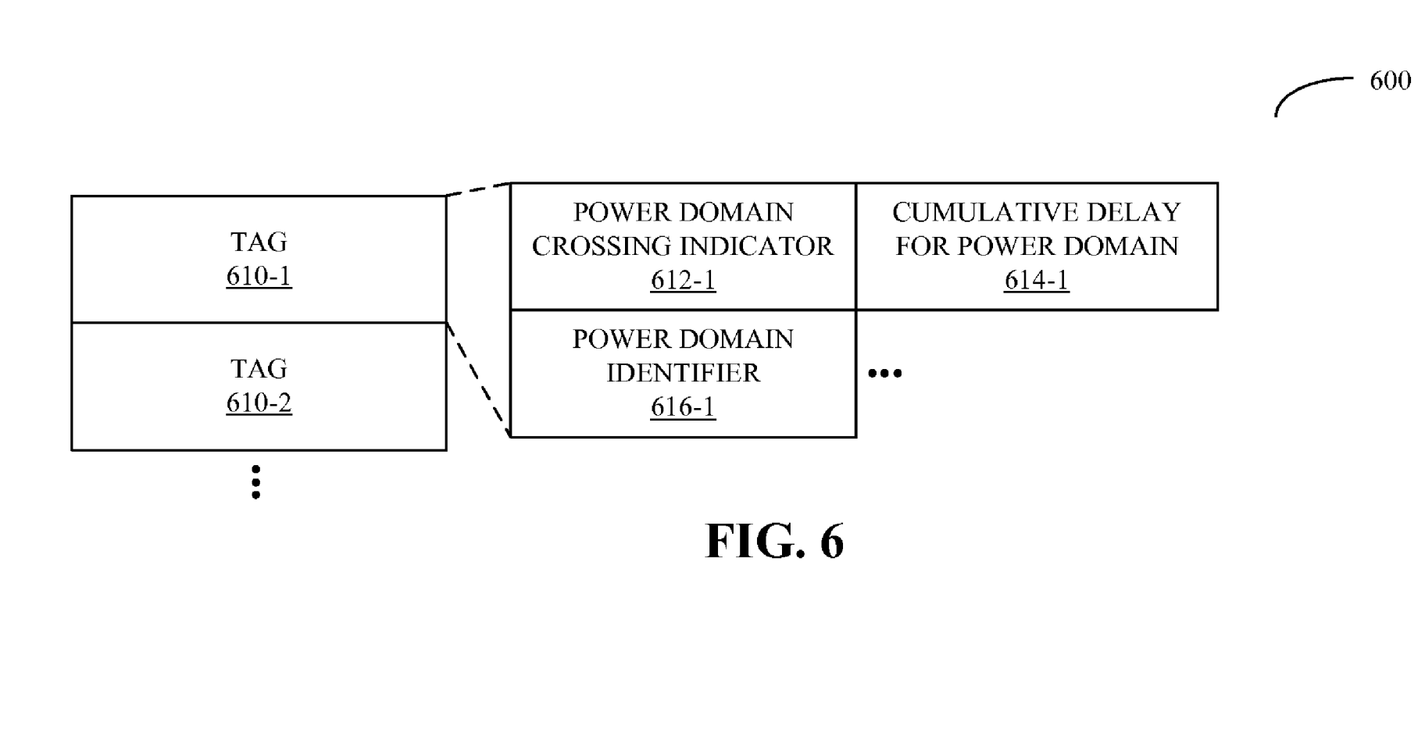
FIG. 6 is a block diagram illustrating a data structure in accordance with an embodiment of the present disclosure.

We now discuss embodiments of data structures that may be used in computer system 500. FIG. 6 presents a block diagram illustrating a data structure 600. This data structure may include tags 610. For example, tag 610-1 may include a power-domain crossing indicator 612-1 which can indicate whether the tag was propagated across a power domain boundary or not. Further, tag 610-1 may also include power domain identifier 616-1 which identifies a power domain, and cumulative delay 614-1 which stores the cumulative delay that was accumulated as the tag was propagated across a power domain.

In some embodiments, circuit 200 (FIG. 2A), computer system 500 (FIG. 5), and/or data structures 600 include fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for performing graph-based static timing analysis for a circuit that includes multiple power domains, comprising:
   receiving delay values for different supply voltage levels; and
   performing, by computer, the graph-based static timing analysis for the circuit by:
      propagating cumulative delay values and power-domain crossing information through a graph-based representation of the circuit to end points of the graph, wherein the power-domain crossing information at least keeps track of whether a power-domain was crossed while traversing the graph, wherein the propagated power-domain crossing information is stored; and
      adjusting cumulative delay values at the end points of the graph based at least on the stored power-domain crossing information.

2. The method of claim 1, wherein adjusting the cumulative delay values involves adding pessimism to a cumulative delay value if the power-domain crossing information indicates that the cumulative delay value was propagated across a power-domain boundary.

3. The method of claim 2, wherein adding the pessimism includes applying a derating factor to the cumulative delay value.

4. The method of claim 2, wherein the pessimism is based at least on a physical model of delay as a function of changes in supply voltage which are associated with the power-domain crossings.

5. The method of claim 1, wherein adjusting the cumulative delay values involves removing pessimism from a cumulative delay value if the power-domain crossing information indicates that the cumulative delay value was not propagated across a power-domain boundary.

6. The method of claim 5, wherein the pessimism is based at least on a physical model of delay as a function of changes in supply voltage which are associated with the power-domain crossings.

7. The method of claim 1, wherein the power-domain crossing information keeps track of cumulative delay contributions of each power domain as the cumulative delay values are propagated through the graph-based representation of the circuit.

8. The method of claim 7, wherein adjusting the cumulative delay values involves removing pessimism from a cumulative delay value based at least on the cumulative delay contributions of each power domain.

9. The method of claim 8, wherein the pessimism is based at least on a physical model of delay as a function of changes in supply voltage which are associated with the power-domain crossings.

10. The method of claim 1, wherein supply voltages in the multiple power domains are at least in part uncorrelated with each other.

11. The method of claim 1, wherein propagating the power-domain crossing information involves:
    assigning tags to starting points of the graph in an initial power domain; and
    modifying the tags at nodes in the graph when power-domain crossings occur on edges in the graph which are incident on these nodes.

12. The method of claim 11, wherein propagating the power-domain crossing information further involves adding new tags at nodes in the graph when power-domain crossings occur on edges in the graph which are incident on these nodes.

13. A non-transitory computer-program product for use in conjunction with a computer system, the computer-program product comprising a computer-readable storage medium and a computer-program mechanism embedded therein for performing graph-based static timing analysis for a circuit that includes multiple power domains, comprising:
    instructions for receiving delay values for different supply voltage levels; and
    instructions for performing the graph-based static timing analysis for the circuit, wherein the instructions for performing the graph-based static timing analysis include:
       instructions for propagating cumulative delay values and power-domain crossing information through a graph-based representation of the circuit to end points of the graph, wherein the power-domain crossing information at least keeps track of whether a power-domain was crossed while traversing the graph, wherein the propagated power-domain crossing information is stored; and
    instructions for adjusting cumulative delay values at the end points of the graph based at least on the stored power-domain crossing information.

14. The computer-program product of claim 13, wherein adjusting the cumulative delay values involves adding pessimism to a cumulative delay value if the power-domain crossing information indicates that the cumulative delay value was propagated across a power-domain boundary.

15. The computer-program product of claim 14, wherein adding the pessimism includes applying a derating factor to the cumulative delay value.

16. The computer-program product of claim 14, wherein the pessimism is based at least on a physical model of delay as a function of changes in supply voltage which are associated with the power-domain crossings.

17. The computer-program product of claim 13, wherein adjusting the cumulative delay values involves removing pessimism from a cumulative delay value if the power-domain crossing information indicates that the cumulative delay value was not propagated across a power-domain boundary.

18. The computer-program product of claim 17, wherein the pessimism is based at least on a physical model of delay as a function of changes in supply voltage which are associated with the power-domain crossings.

19. The computer-program product of claim 13, wherein the power-domain crossing information keeps track of cumulative delay contributions of each power domain as the cumulative delay values are propagated through the graph-based representation of the circuit.

20. The computer-program product of claim 19, wherein adjusting the cumulative delay values involves removing pessimism from a cumulative delay value based at least on the cumulative delay contributions of each power domain.

21. The computer-program product of claim 20, wherein the pessimism is based at least on a physical model of delay as a function of changes in supply voltage which are associated with the power-domain crossings.

22. The computer-program product of claim 13, wherein propagating the power-domain crossing information involves:
assigning tags to starting points of the graph in an initial power domain; and
modifying the tags at nodes in the graph when power-domain crossings occur on edges in the graph which are incident on these nodes.

23. The computer-program product of claim 22, wherein propagating the power-domain crossing information further involves adding new tags at nodes in the graph when power-domain crossings occur on edges in the graph which are incident on these nodes.

24. A computer system, comprising:
a processor;
memory;
a program module, wherein the program module is stored in the memory and configured to be executed by the processor to perform graph-based static timing analysis for a circuit that includes multiple power domains, the program module including:
instructions for receiving delay values for different supply voltage levels; and
instructions for performing the graph-based static timing analysis for the circuit, wherein the instructions for performing the graph-based static timing analysis include:
instructions for propagating cumulative delay values and power-domain crossing information through a graph-based representation of the circuit to end points of the graph, wherein the power-domain crossing information at least keeps track of whether a power-domain was crossed while traversing the graph, wherein the propagated power-domain crossing information is stored; and
instructions for adjusting cumulative delay values at the end points of the graph based at least on the stored power-domain crossing information.

* * * * *